United States Patent [19]

Hellmann et al.

[11] 3,726,003
[45] Apr. 10, 1973

[54] METHOD OF MAKING A DISK TAPE COMMUTATOR

[75] Inventors: John V. Hellmann, Anderson; Carl L. Richwine, Daleville, both of Ind.

[73] Assignee: General Motors Corporation, Detroit, Mich.

[22] Filed: Aug. 5, 1971

[21] Appl. No.: 169,306

Related U.S. Application Data

[62] Division of Ser. No. 36,322, May 11, 1970, abandoned.

[52] U.S. Cl. ....................29/597, 310/235, 310/237
[51] Int. Cl. ..............................................H01r 43/00
[58] Field of Search..............................29/597, 598; 310/235, 237, 42

[56] References Cited

UNITED STATES PATENTS

| | | | |
|---|---|---|---|
| 3,521,101 | 7/1970 | Arora | 310/233 |
| 1,919,995 | 7/1933 | Wry | 29/605 UX |
| 3,478,421 | 11/1969 | Preece | 29/597 |
| 2,953,698 | 9/1960 | Gianotto | 29/597 X |
| 3,487,249 | 12/1969 | Nicholls et al. | 310/237 X |
| 2,696,570 | 12/1954 | Pandapas | 310/233 X |
| 1,536,328 | 5/1925 | Caruso | 310/237 |

Primary Examiner—Richard J. Herbst
Assistant Examiner—Carl E. Hall
Attorney—C. R. Meland

[57] ABSTRACT

A disk type commutator for a direct current motor comprising a plurality of wedge-shaped conductive members carried by an annular insulating member that provide commutator segments for the commutator. The conductive members and the insulating member have aligned apertures through which the ends of the rotor windings are inserted for connection with the conductive members at the face of the commutator. The face of the commutator is machined to provide a surface that engages the motor brushes. Both the conductive members and the rotor winding ends contact the motor brushes in operation.

1 Claim, 5 Drawing Figures

PATENTED APR 10 1973

INVENTORS
John V. Hellmann &
BY Carl L. Richwine

C. R. Meland
ATTORNEY

INVENTORS
John V. Hellmann &
BY Carl L. Richwine

C. R. Meland
ATTORNEY

METHOD OF MAKING A DISK TAPE COMMUTATOR

This application is a division of application Ser. No. 36,322, filed May 11, 1970, now abandoned.

This invention relates to a disk type commutator and its method of manufacture.

In this invention, a commutator for use in a DC motor is provided wherein a plurality of wedge-shaped conductive members molded to an insulating member form commutator segments which are employed in the commutation of current supplied to the rotor windings. The rotor windings are inserted through aligned apertures in the insulating member and the conductive members and are electrically connected with the conductive members. In this commutator, the motor brushes contact both the rotor winding ends and the conductive members.

It is an object of the present invention to provide a disk type commutator for a DC motor wherein apertures are provided in the commutator which receive the ends of rotor windings and wherein the ends of the rotor windings are connected to commutator segments and form part of the commutator segments.

Another object of the present invention is to provide a method of manufacturing a disk type commutator for a DC motor wherein the ends of rotor windings are inserted through openings formed in commutator segments and are secured to the segments, and the entire assembly including the ends of the rotor winding is then machined to provide a smooth brush engaging commutating surface.

Additional objects and advantages of the present invention will be apparent in light of the following description. The accompanying drawings which disclose a preferred embodiment of the present invention are incorporated in the description.

Figure 1:
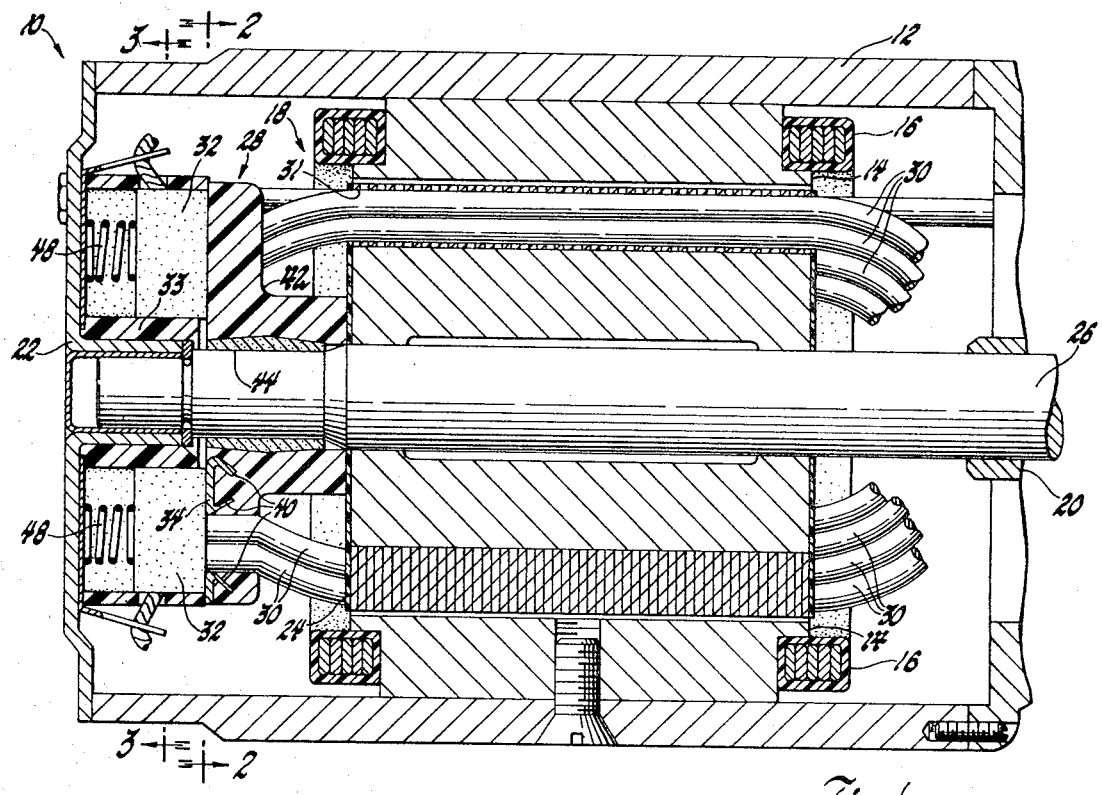
FIG. 1 is a sectional view of a DC motor provided with a disk type commutator made in accordance with the present invention.

Referring now to the drawings and more particularly to FIG. 1, a sectional view of a DC motor 10 is shown. This DC motor 10 is comprised of an annular frame 12, pole pieces 14, a field winding 16, and a rotor or armature 18. The shaft of the rotor 18 is rotatably supported at its opposite ends by bearings 20 and 22.

The rotor 18 is comprised of an armature core or body 24 formed of laminated magnetic material that is carried by a rotor shaft 26, a disk type commutator 28 described hereinafter, and a plurality of rotor windings 30. The commutator 28 is carried by shaft 26 and the windings 30 are located within slots 31 formed in core 24. The rotor shaft 26 can be connected to a load which is not shown and the motor can be used, for example, as a cranking motor for cranking an internal combustion engine. Motor brushes 32 provide electrical energization of the rotor windings 30 for motor operation and are slidably supported in a brush-holder 33 shown in FIGS. 1 and 3 and formed of insulating material. These brushes make contact with the conductive members 34 on the face of the commutator 28 and they also make contact with the ends of the rotor windings 30 in a manner detailed below.

At this time, FIGS. 1, 2, 4 and 5 should be considered. These figures facilitate an understanding of the structure of the commutator 28 and its method of manufacture.

Figure 4:
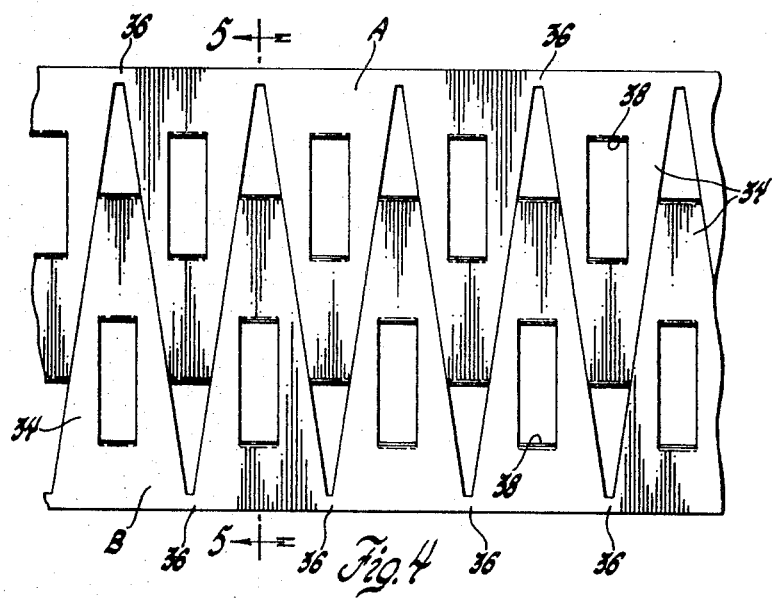
FIG. 4 is a plan view of the commutator segments incorporated in the disk type commutator of this invention at an early stage in the fabrication process.
Figure 5:
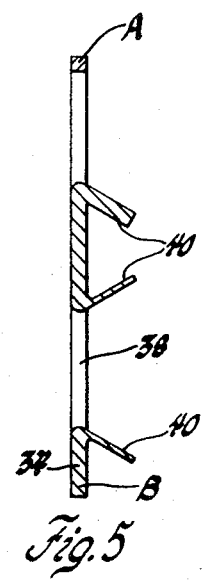
FIG. 5 is an end view of the stamping shown in FIG. 4.

In FIG. 4, two copper stampings A, B are shown wherein a plurality of truncated wedge-shaped conductive members are formed in two connected series. These stampings can be formed by feeding a copper sheet into a progressive die punch press wherein the various forming operations are performed in successive steps as the parts pass through the die. Each of the wedge-shaped copper members 34 of the stampings A and B is provided with an aperture 38 in the stamping operations. As shown in FIG. 5, the truncated wedge-shaped conductive members 34 are provided with three tabs 40 on each wedge-shaped member 34 during the stamping operations by forming the truncated ends and the aperture material into tabs 40.

In the fabrication of a commutator, one of the stampings A or B is folded into a substantially circular configuration with the connecting segments 36 of FIG. 4 on the outer perimeter. The resultant copper disk is molded to a quantity of insulating material, for example, a phenolic composition to form the annular insulating phenolic block 42 in FIG. 1. This annular insulating member 42 is provided with apertures aligned with the apertures 38 of the conductive members 34. These apertures in the insulating member can be provided by known core techniques during the molding of the copper part to the insulating material. The commutator 28 of FIG. 1 shows the copper segments 34 molded to the face of the phenolic annular member 42. As shown in FIG. 1, the insulating material extends to the surface of the conductive members 34, thus filling the slots separating the individual commutator segments. The tabs 40 of the copper segments 34 are molded in the annular member 42 and they serve to secure the copper segments 34 to the annular insulating member 42. A zinc core 44 is molded to the annular insulating member 42 during the molding operation and the resultant commutator is mounted on the rotor shaft 26 by means of an interference fit between the shaft 26 and the zinc core 44 as shown in FIG. 1.

Figure 2:
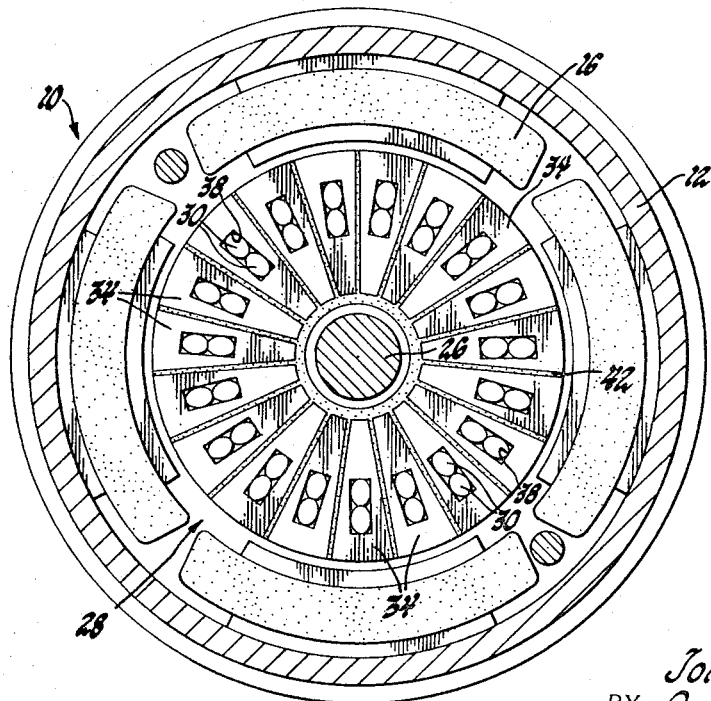
FIG. 2 is a view partly in section taken along line 2—2 of FIG. 1 including a plan view of the disk type commutator.

After molding the copper disk to the annular insulating member 42, the connecting links 36, shown in FIG. 4, are machined away to provide electrically isolated commutator segments individually supported by insulator 42. The commutator assembly is then fitted to shaft 26 and moved axially so that the ends of the rotor windings 30 are inserted through the apertures 38 in the isolated copper segments 34 and the annular insulating member 42 as shown in FIG. 2. During the insertion process, the copper segments 34 and the copper windings 30 are mechanically deformed as a result of interference between the copper segments 34 and the windings 30 and an intimate copper-to-copper bond is created between the rotor winding conductors 30 and the copper wedge-shaped segments 34. This bond is strengthened by a soldering process which also affords protection against corrosion. Solder is applied by bringing the face of the disk commutator 28 in contact with molten solder and relying on capillary action to fill the spaces between the copper segments 34 and the copper rotor windings 30.

To ensure that optimum contact is made between the brushes 32 of FIG. 1 and the commutator segments 34 and the ends of the rotor winding conductors 30 which actually form a part of each commutator segment, the face of the disk commutator 28 is machined to provide a plane surface for commutation which includes the copper segments 34 and the ends of the rotor windings 30. This machining step produces a flat surface facilitating the commutation of current supplied the rotor windings 30.

Figure 3:
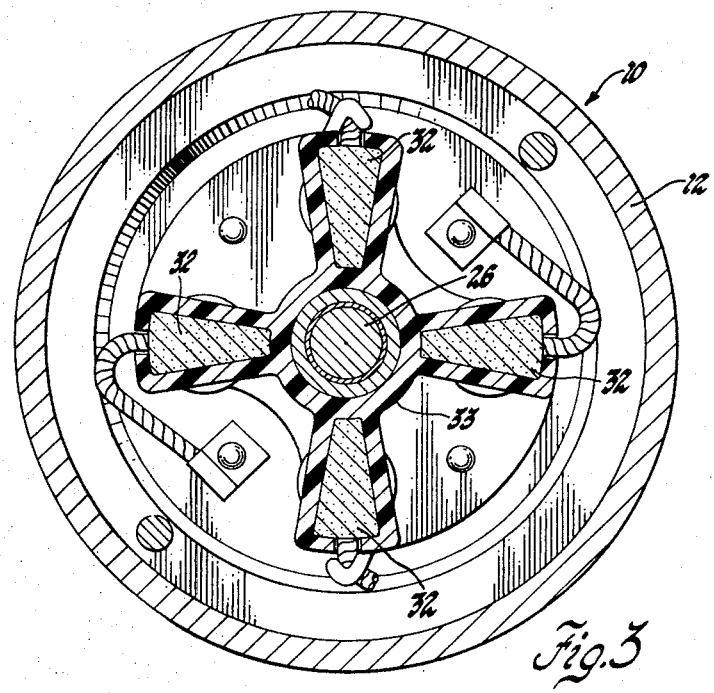
FIG. 3 is a sectional view taken along line 3—3 of FIG. 1 and showing the motor brushes.

The four motor brushes 32 of FIG. 3 ride on the machined surface of the commutator 28. These brushes 32 are shown in FIGS. 1 and 3 supported by brushholder 33 and are urged into contact with the copper segments 34 and the ends of the rotor windings 30 by springs 48. Accordingly, current is sequentially switched in the rotor windings of the DC motor during periods of motor operation.

The disk type commutator disclosed hereinabove together with its method of manufacture provides a simple, low cost commutator arrangement for inclusion in direct current dynamoelectric machines. In addition to cost and simplicity, this commutator affords advantages in reliability and durability as a result of the configuration of the commutator wherein the rotor winding ends are captured in the commutator and included in the commutation plane surface. Winding throw-out is virtually impossible as a result of the captured character of the commutator-winding connection and commutation is enhanced as a result of the brush-winding contact which is effected by the inclusion of the rotor winding ends in the commutation plane surface.

We claim:

1. A method of manufacturing a disk type commutator for a rotor of a dynamoelectric machine, the steps comprising, providing a strip of electrically conductive material, cutting said material to form a plurality of wedge-shaped commutator segments connected by thin connecting portions located along one edge of said strip, forming a conductor receiving opening in each commutator segment by cutting and forcing out two adjacent portions of each segment to form a pair of integral anchoring tabs extending axially from said segments, folding said strip into a circular configuration with the edges of said segments spaced from each other and with said one edge of said strip located at the outer periphery, molding a quantity of insulating material to the side of said folded strip having said integral anchoring tabs and during said molding forming a plurality of conductor receiving openings in said insulating material aligned with the openings in said segments, said openings formed in said insulating material being substantially the same size as said openings formed in said segments, said molding material being molded to said anchoring tabs whereby an annular insulator is formed which is connected to said segments and which has openings aligned with the openings in said segments, and removing said connecting portions to form insulated commutator segments, said aligned openings in said segments and annular insulator adapted to receive axially extending rotor conductors which are electrically connected to said segments.

* * * * *